(12) United States Patent
Arngren et al.

(10) Patent No.: US 12,524,515 B2
(45) Date of Patent: Jan. 13, 2026

(54) AUTHENTICATING A USER

(71) Applicant: Telefonaktiebolaget LM Ericsson (publ), Stockholm (SE)

(72) Inventors: Tommy Arngren, Södra Sunderbyn (SE); Peter Ökvist, Luleå (SE); Andreas Kristensson, Södra Sandby (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 257 days.

(21) Appl. No.: 18/268,540

(22) PCT Filed: Dec. 21, 2020

(86) PCT No.: PCT/EP2020/087515
§ 371 (c)(1),
(2) Date: Jun. 20, 2023

(87) PCT Pub. No.: WO2022/135674
PCT Pub. Date: Jun. 30, 2022

(65) Prior Publication Data
US 2024/0311462 A1 Sep. 19, 2024

(51) Int. Cl.
*G06F 21/36* (2013.01)
*G06F 3/01* (2006.01)
(Continued)

(52) U.S. Cl.
CPC .............. *G06F 21/36* (2013.01); *G06F 3/016* (2013.01); *G06F 3/0481* (2013.01); *G06F 3/0488* (2013.01); *G06F 3/167* (2013.01)

(58) Field of Classification Search
CPC ........ G06F 21/36; G06F 3/016; G06F 3/0481; G06F 3/0488; G06F 3/167
See application file for complete search history.

(56) References Cited

U.S. PATENT DOCUMENTS 10,222,891 B1 * 3/2019 Smith ...................... G06F 3/013
10,739,896 B2 * 8/2020 Kim .................... G06F 3/04883
(Continued)

FOREIGN PATENT DOCUMENTS

EP   3 246 792 A1   11/2017

OTHER PUBLICATIONS

International Search Report and Written Opinion issued in International Application No. PCT/EP2020/087515 dated Sep. 6, 2021 (12 pages).

(Continued)

*Primary Examiner* — Oleg Survillo
(74) *Attorney, Agent, or Firm* — Sage Patent Group

(57) ABSTRACT

It is provided a method for authenticating a user. The method comprises the steps of: detecting a user input of a passcode element to a user input device; determining a virtual-surface component of the passcode element, the virtual-surface component being one of a finite set of possible virtual-surface components; determining a depth component of the passcode element, the depth component depending on an input force, the depth component being one in a finite set of possible depth components, each corresponding to one of a finite set of possible virtual surfaces; repeating the steps of detecting a user input, determining a virtual-surface component and determining a depth component, for a plurality of passcode elements, resulting in a sequence of passcode elements making up a passcode; and authenticating the user based on both the virtual-surface component and the depth component of each passcode element in the passcode.

20 Claims, 3 Drawing Sheets

(51) Int. Cl.
*G06F 3/0481* (2022.01)
*G06F 3/0488* (2022.01)
*G06F 3/16* (2006.01)
*H04W 12/06* (2021.01)
*H04W 12/68* (2021.01)
*H04W 88/02* (2009.01)

(56) References Cited

U.S. PATENT DOCUMENTS

| | | | | |
|---|---|---|---|---|
| 2009/0313693 | A1* | 12/2009 | Rogers | H04W 12/06 |
| | | | | 345/173 |
| 2011/0050576 | A1* | 3/2011 | Forutanpour | G06F 3/04886 |
| | | | | 345/173 |
| 2012/0313872 | A1* | 12/2012 | Zhang | G06F 3/0416 |
| | | | | 345/173 |
| 2013/0147793 | A1* | 6/2013 | Jeon | G06F 3/0488 |
| | | | | 345/157 |
| 2017/0308240 | A1* | 10/2017 | Yeh | G02F 1/13338 |
| 2018/0284915 | A1* | 10/2018 | Kim | G06F 3/0445 |
| 2018/0314404 | A1* | 11/2018 | Yoon | G06F 3/0488 |
| 2019/0220183 | A1* | 7/2019 | Mummidi | G06F 40/274 |
| 2020/0050326 | A1* | 2/2020 | Kim | G06F 16/00 |

OTHER PUBLICATIONS

Apple, "Human Interface Guidelines," https://developer.apple.com/design/human-interface-guidelines/ios/user-interaction, Jan. 30, 2021 (4 pages).

* cited by examiner

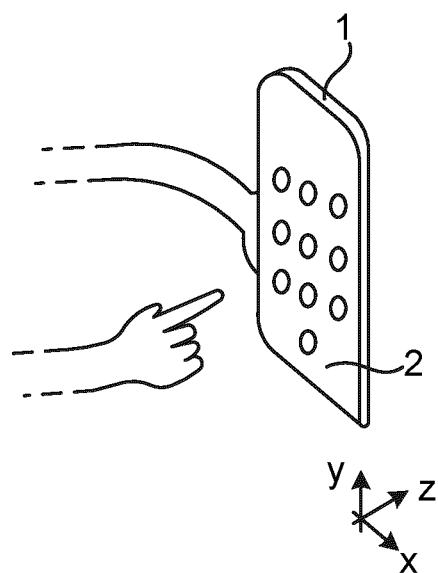
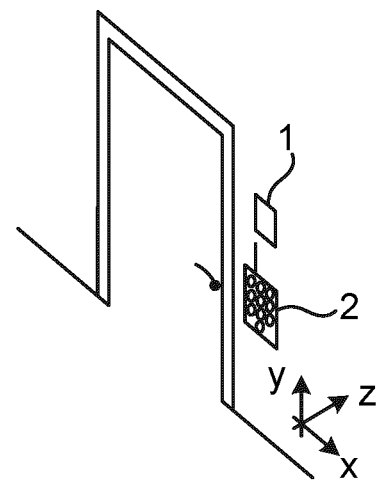
Fig. 1　　　　　　　　　　Fig. 2
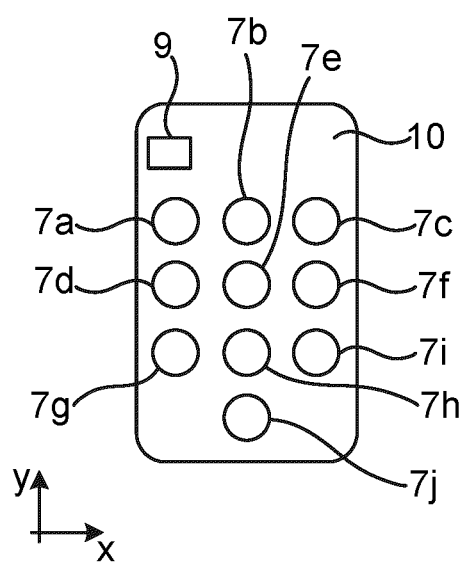
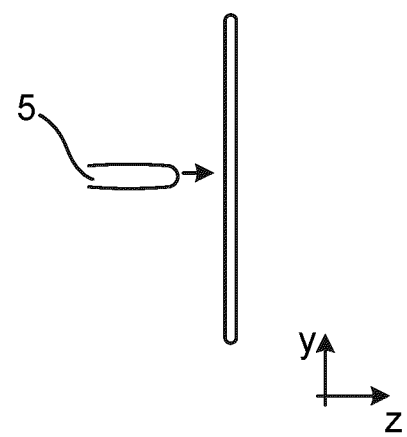
Fig. 3A　　　　　　　　　Fig. 3B

AUTHENTICATING A USER

CROSS REFERENCE TO RELATED APPLICATIONS

This application is a 35 U.S.C. § 371 National Stage of International Patent Application No. PCT/EP2020/087515, filed 2020 Dec. 21.

TECHNICAL FIELD

The present disclosure relates to the field of user authentication, and in particular to authenticating a user based on a surface component and a depth component of passcode elements forming a passcode.

BACKGROUND

Passcodes have been around for a long time. For instance, personal identification numbers (PINs), often in the form of a four or six-digit sequence are commonly used. PINs are used for authentication in many different contexts, e.g. for unlocking phones, using credit cards for purchases or cash withdrawals in automatic teller machines (ATMs). PINs are also used for authentication to electronic locks for access to locked physical spaces.

Passcodes in general, and PINs in particular, are relatively easy for a criminal to learn. For instance, the criminal could look over the shoulder of the person entering the passcode. There is also software, in the form of keyloggers, that can record key entries when the passcode is entered. The criminal can also find fingerprint-smudge patterns left on a touchscreen or keypad, that can reveal, or at least narrow-down, the likely components (e.g. digits) of the passcode.

SUMMARY

One object is to provide a way to authenticate in an intuitive and more secure manner than known ways of entering passcodes.

According to a first aspect, it is provided a method for authenticating a user. The method is performed in an authentication device. The method comprises the steps of: detecting a user input of a passcode element to a user input device; determining a virtual-surface component of the passcode element, the virtual-surface component corresponding to a position, of a digit of a user, along a virtual surface, the virtual-surface component being one of a finite set of possible virtual-surface components being selectable on the virtual surface; determining a depth component of the passcode element, the depth component depending on an input force causing a digit of a user to touch the virtual surface, the depth component being one in a finite set of possible depth components, each corresponding to one of a finite set of possible virtual surfaces; repeating the steps of detecting a user input, determining a virtual-surface component and determining a depth component, for a plurality of passcode elements, resulting in a sequence of passcode elements making up a passcode; and authenticating the user based on both the virtual-surface component and the depth component of each passcode element in the passcode.

The step of detecting may comprise obtaining the passcode element when it is detected that the user abstains from exerting physical pressure on the user input device.

The step of detecting may comprise obtaining the passcode element when it is detected that the user moves a digit away from a position corresponding to a virtual-surface component.

The user input device may be a touchscreen, in which case each possible virtual-surface component corresponds to a respective symbol. The method then further comprises the step of: presenting symbols of available virtual-surface components in respective positions on the touchscreen.

The step of presenting available symbols may comprise presenting different available symbols depending on the virtual surface corresponding to the current depth component.

The step of presenting available symbols may comprise presenting available symbols depending on a user configuration.

The method may further comprise the step of: providing, during the progression of user input of the passcode element, feedback on a current depth component.

The feedback may comprise a visual feedback provided on the touchscreen.

The feedback may comprise a haptic feedback detectable when using the touchscreen.

The feedback may comprise audible feedback.

The type of feedback may depend an environmental state detected by the authentication device.

The set of possible virtual-surface components may be selected from the group of sets consisting of ten numerical digits, alphabetic letters, and pre-defined set of pictograms.

In the step of determining a depth component, a threshold between different depth components may depend on a depth component of a subsequent expected passcode element.

The threshold may be determined such that it is easier for the user to input the depth component of a subsequent expected passcode element.

According to a second aspect, it is provided an authentication device for authenticating a user. The authentication device comprises: a processor; and a memory storing instructions that, when executed by the processor, cause the authentication device to: detect a user input of a passcode element to a user input device; determine a virtual-surface component of the passcode element, the virtual-surface component corresponding to a position, of a digit of a user, along a virtual surface, the virtual-surface component being one of a finite set of possible virtual-surface components being selectable on the virtual surface; determine a depth component of the passcode element, the depth component depending on an input force causing a digit of a user to touch the virtual surface, the depth component being one in a finite set of possible depth components, each corresponding to one of a finite set of possible virtual surfaces; repeat the instructions to detect a user input, determine a virtual-surface component and determine a depth component, for a plurality of passcode elements, resulting in a sequence of passcode elements making up a passcode; and authenticate the user based on both the virtual-surface component and the depth component of each passcode element in the passcode.

The instructions to detect may comprise instructions that, when executed by the processor, cause the authentication device to obtain the passcode element when it is detected that the user abstains from exerting physical pressure on the user input device.

The instructions to detect may comprise instructions that, when executed by the processor, cause the authentication device to obtain the passcode element when it is detected that the user moves a digit away from a position corresponding to a virtual-surface component.

The user input device may be a touchscreen, in which case each possible virtual-surface component corresponds to a respective symbol. The instructions then further comprise instructions that, when executed by the processor, cause the authentication device to: present symbols of available virtual-surface components in respective positions on the touchscreen.

The instructions to present available symbols may comprise instructions that, when executed by the processor, cause the authentication device to present different available symbols depending on the virtual surface corresponding to the current depth component.

The instructions to present available symbols may comprise instructions that, when executed by the processor, cause the authentication device to present available symbols depending on a user configuration.

The authentication device may further comprise instructions that, when executed by the processor, cause the authentication device to provide, during the progression of user input of the passcode element, feedback on a current depth component.

The feedback may comprise a visual feedback provided on the touchscreen.

The feedback may comprise a haptic feedback detectable when using the touchscreen.

The feedback may comprise audible feedback.

The type of feedback may depend an environmental state detected by the authentication device.

The set of possible virtual-surface components may be selected from the group of sets consisting of ten numerical digits, alphabetic letters, and pre-defined set of pictograms.

A threshold between different depth components may depend on a depth component of a subsequent expected passcode element.

The threshold may be determined such that it is easier for the user to input the depth component of a subsequent expected passcode element.

According to a third aspect, it is provided a computer program for authenticating a user. The computer program comprises computer program code which, when executed on a authentication device causes the authentication device to: detect a user input of a passcode element to a user input device; determine a virtual-surface component of the passcode element, the virtual-surface component corresponding to a position, of a digit of a user, along a virtual surface, the virtual-surface component being one of a finite set of possible virtual-surface components being selectable on the virtual surface, wherein each possible virtual-surface component corresponds to a respective symbol; determine a depth component of the passcode element, the depth component depending on an input force causing a digit of a user to touch the virtual surface, the depth component being one in a finite set of possible depth components, each corresponding to one of a finite set of possible virtual surfaces; repeat the code to detect a user input, determine a virtual-surface component and determine a depth component, for a plurality of passcode elements, resulting in a sequence of passcode elements making up a passcode; and authenticate the user based on both the virtual-surface component and the depth component of each passcode element in the passcode.

According to a fourth aspect, it is provided a computer program product comprising a computer program according to the third aspect and a computer readable means on which the computer program is stored.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

Aspects and embodiments are now described, by way of example, with reference to the accompanying drawings, in which:

FIG. 1 is a schematic diagram illustrating an environment in which embodiments are presented in the context of a mobile phone;

FIG. 2 is a schematic diagram illustrating an environment in which embodiments are presented in the context of a keypad for an electronic lock for securing a physical space;

FIG. 3A is a schematic diagram illustrating an embodiment of a virtual surface which can be employed in the environments shown in FIG. 1 and FIG. 2;

FIG. 3B is a schematic diagram illustrating how a digit of a user is used to interact with the virtual surface of FIG. 3A;

DETAILED DESCRIPTION

Figure 4:
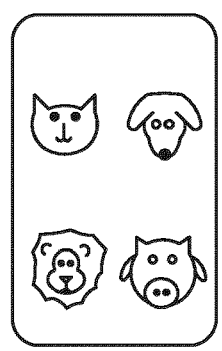
FIG. 4 is a schematic diagram illustrating an embodiment using pictograms as symbols on a virtual surface, such as the virtual of FIGS. 3A-B.

The aspects of the present disclosure will now be described more fully hereinafter with reference to the accompanying drawings, in which certain embodiments of the invention are shown. These aspects may, however, be embodied in many different forms and should not be construed as limiting; rather, these embodiments are provided by way of example so that this disclosure will be thorough and complete, and to fully convey the scope of all aspects of invention to those skilled in the art. Like numbers refer to like elements throughout the description.

Embodiments presented herein provide an improved way of entering passcodes, made up of a sequence of passcode elements. Specifically, instead of a single surface for entering a passcode, a depth component is used to switch between a plurality of (essentially) parallel virtual surfaces. Each passcode element thus comprises both a virtual-surface component (along the virtual surface) and a depth component, indicating the selected virtual surface. Compared to traditional single-plane passcode entry (e.g. PIN entry), the embodiments presented herein provide an additional (depth) dimension of passcode entry. This solution is significantly more difficult for an external party to learn by observation, thus increasing security. Moreover, this extra component allows greater differentiation between codes, while still keeping code entry simple and intuitive for the user. For instance, if three virtual surfaces are supplied with ten numbers on each, there are thirty different possible values for each passcode elements, which is three times the amount of possible values for a traditional ten-digit PIN entry.

FIG. 1 is a schematic diagram illustrating an environment in which embodiments are presented, where the authentication device 1 is embodied in a mobile phone for passcode entry. The mobile phone is thus the host device for the authentication device 1. Alternatively, the authentication device 1 can be implemented in a server with communication ability with the mobile phone. The server can then be a central cloud server or an edge cloud server, where the edge cloud server is provided topologically close to the mobile phone. In this case, the user input device 2 is in the form of a touchscreen, essentially in an x-y plane in an aligned co-ordinate system. The input force provided by the user 5 on the touchscreen is used to select one of a plurality of virtual surfaces, where the virtual surfaces can be thought of as surfaces parallel to the touchscreen but at different levels of depths. The user 5 thereby inputs a plurality of passcode elements using the touchscreen to make up a passcode for authenticating the user 5.

Along the virtual surface (which can be displayed on the touchscreen), there are a set of virtual-surface components, where each virtual-surface component can be shown as a different symbol. For instance, the symbols can be numerical digits, alphabetic letters, and/or pictograms.

According to embodiments presented herein, also a depth component, essentially along the z-direction, of each passcode element is detected by the touch screen 2. The depth component can be detected by the touchscreen depending-on how hard the user 5 presses her/his digit against the touchscreen 2. A harder press results in a greater value for depth-component determination, as detected e.g. using a pressure sensor. The depth component is used by the user 5 to switch to a desired virtual surface and to obtain a depth component of each entered passcode element. In one embodiment, the authentication e.g. for an unlock operation, starts by a first touch on the touch screen 2, with a depth component (e.g. pressure) that has the correct pressure according to a pre-determined depth component. Only when the depth component is confirmed, the touch screen reveals a virtual surface.

Hence, the depth component depends on an input force, created by the user 5, that causes a digit of the user to touch the virtual surface. The detected depth value of the passcode element is discretised to a depth component of a set of possible depth component. Each depth value corresponds to one of a finite set of possible virtual surfaces.

In this way, the user can input a passcode consisting of a sequence of passcode elements, where each passcode element comprises both a virtual-surface component (along the virtual surface) and a depth component (corresponding to a selection of a particular virtual surface).

Once the passcode has been entered, it is evaluated and if it corresponds to a correct passcode, the user is authenticated, e.g. for unlocking the mobile phone or approving some action on the mobile phone.

FIG. 2 is a schematic diagram illustrating an environment in which embodiments are presented in the context of a keypad 2 for an electronic lock for securing a physical space. The keypad 2 can e.g. contain keys for digits 0-9 and optionally other keys, such as for '#', '*' and/or other keys. At least the keys used for passcode input are capable of detecting a depth component, e.g. by detecting input force on the key. In this embodiment, in a similar way as in the embodiment of FIG. 1, each detected passcode element comprises both a virtual-surface component (corresponding to the selected key) and a depth component. The authentication is performed in an authentication device 1, which is connected to the keypad 2 (as shown) or can be provided in the same device as the keypad 2 (not shown).

The embodiments presented herein could also be applied in the context of XR (Extended Reality), including e.g. AR (Augmented Reality) and VR (Virtual Reality). This can e.g. be combined with exoskeleton supported haptic gloves (where progression through virtual surfaces can be simulated).

FIG. 3A is a schematic diagram illustrating an embodiment of a virtual surface 10 which can be employed in the environments shown in FIG. 1 and FIG. 2.

The virtual surface 10 can be presented e.g. on the touchscreen of FIG. 1. The virtual surface 10 comprises a set of ten virtual-surface components 7a-j, corresponding to respective symbols. In this example, each of the virtual-surface components 7a-j correspond to a respective digit (0-9) (not shown). It is to be noted that while the virtual-surface components 7a-j are here associated with corresponding symbols, the virtual-surface components 7a-j could also be represented without different symbols, e.g. as similar or identical markings (e.g. circles) on the touchscreen, in which case the virtual-surface components 7a-j are distinguishable only by their respective positions on the touchscreen.

Optionally, a visual indicator 9 is shown, indicting the current virtual surface (which depends on the input force of the user causing the digit of the user to touch the virtual surface). The visual indicator 9 can be a logical representation, e.g. a number, or it can be a graphical representation, e.g. showing a selected virtual surface in a set of a plurality of virtual surfaces.

FIG. 3B is a schematic diagram illustrating how a digit of a user 5 is used to interact with the virtual surface of FIG. 3A. This illustrates how a digit of the user 5 is moved to touch the virtual surface, by the user exerting an input force causing the digit 5 of a user 5 to touch the touchscreen.

FIG. 4 is a schematic diagram illustrating an embodiment using pictograms as symbols on a virtual surface, such as the virtual surface of FIGS. 3A-B. Hence, when symbols are used for the virtual-surface components, the symbols do not need to be numbers or letters. The pictograms can be useful for use with persons who cannot read, such as small children.

Figure 5:
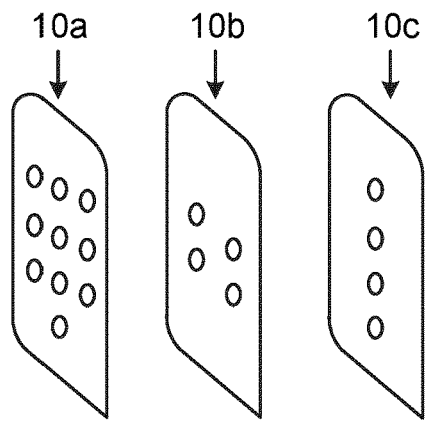
FIG. 5 is a schematic diagram illustrating different virtual surfaces at different depth levels.

FIG. 5 is a schematic diagram illustrating different virtual surfaces at different depth levels. In this example, there is a first virtual surface 10a, a second virtual surface 10b and a third virtual surface 10c. Each virtual surface 10a-c can have a different set of virtual surface components. In the example illustrated in FIG. 5, the first virtual surface 10a has ten virtual surface components, e.g. corresponding to symbols in the form of digits 0-9. The second virtual surface 10b has four virtual surface components, e.g. corresponding to symbols in the form of pictograms of different animals. The third virtual surface 10c has four linearly provided virtual surface components, e.g. corresponding to symbols in the form of letters a-d.

Optionally, the number of and composition of the virtual surfaces 10a-c are user configurable. This allows a user to select a set of symbols and layout that is intuitive and natural to that particular user, prior to selecting and entering the actual passcode.

Figure 6A:
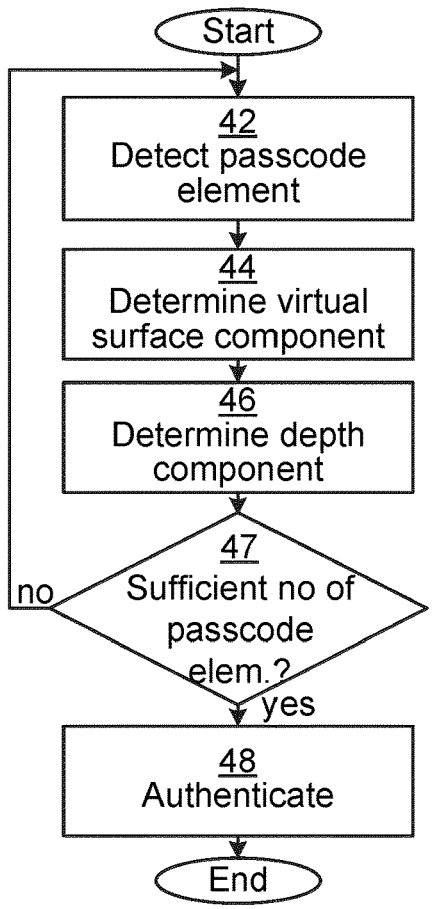
FIGS. 6A-B are flow charts illustrating embodiments of methods for authenticating a user.
Figure 6B:
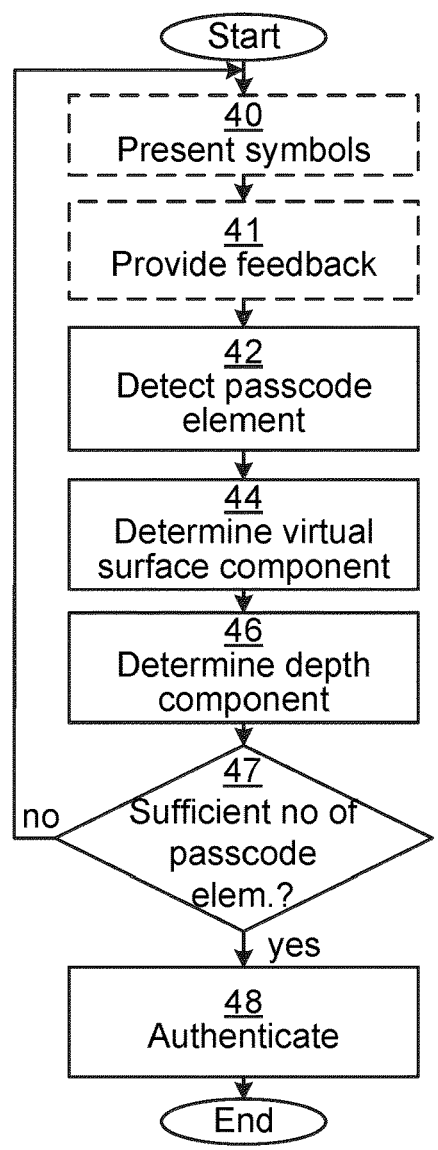

FIGS. 6A-B are flow charts illustrating embodiments of methods for authenticating a user. This is based on the user inputting a sequence of passcode elements that make up a passcode. The method is performed in an authentication device 1.

In a detect passcode element step 42, the authentication device 1 detects a user input of a passcode element to a user input device 2.

The trigger of the detection of the passcode element can be when it is detected that the user abstains from exerting physical pressure on the user input device 2. In other words, when the user removes a digit from the user input device, this can be an indication that the passcode element has been input.

Alternatively, the passcode element is obtained when it is detected that the user moves a digit (e.g. finger) away from a position corresponding to a virtual-surface component. In other words, the user can indicate that the input of the passcode element is done by moving the digit (e.g. finger) away. This solution is suited when the passcode is input by the user moving her/his digit (e.g. finger) between different passcode elements without lifting the digit.

In a determine virtual surface component step 44, the authentication device 1 determines a virtual-surface component of the passcode element. The virtual-surface component corresponds to a position, of a digit (i.e. finger, thumb, or even toe) of a user, along a virtual surface. The virtual-surface component is one of a finite set of possible virtual-surface components being selectable on the virtual surface. Each possible virtual-surface component corresponds to a respective symbol.

The set of possible virtual-surface components can be selected from the group of sets consisting of ten numerical digits, alphabetic letters, and pre-defined set of pictograms.

In a determine depth component step 46, the authentication device determines a depth component of the passcode element, the depth component depending on an input force causing a digit (e.g. finger) of a user to touch the virtual surface. Hence, the amount of force that the user exerts on a finger affects the determination of the depth component. This difference in input force can be detected in different ways, e.g. using a pressure sensor, or a 3D imaging of the digit (e.g. finger) resulting in different positions of the finger in a component perpendicular to the virtual surface. The depth component is one in a finite set of possible depth components, each corresponding to one of a finite set of possible virtual surfaces.

A threshold between different depth components can be configured to depend on a depth component of a subsequent expected passcode element. For instance, the threshold is determined such that it is easier for the user to input the depth component of a subsequent expected passcode element.

Optionally, a threshold between different depth components can be configured to depend on a current state of the user, e.g. based on biological data such as heart rate, skin temperature, etc.

Optionally, a threshold between different depth components can be configured to depend on the current depth component. For example, three upper depth components can be more shallow (thinner), requiring better precision of the hardness of press, whereas higher depth component may be wider, i.e. more lenient to depth input variations.

In a conditional sufficient number of passcode elements step 47, the authentication device determines whether sufficient number of passcode elements have been obtained. This number can be any suitable number. If the authentication device determines that a sufficient number of passcode elements have been obtained, the method proceeds to an authenticate step 48, where the sequence of passcode elements make up a passcode. Otherwise, the method returns to the detect passcode element step 42.

In the authenticate step 48, the authentication device authenticates 48 the user 5 based on both the virtual-surface component and the depth component of each passcode element in the passcode. The passcode is then compared to a stored correct passcode to see if the passcode is correct, after which authentication is positive.

The stored correct passcode can be input in the same was as described above, or by entering data, e.g. symbol and depth value for each passcode element. Optionally, during the input of the stored code, the user can be prompted to define her presses for different depth components, e.g. to define the pressure of a soft, medium and hard press. This can define the dynamic range of pressure for that particular user.

Optionally, the user can also configure and personalise pressure to a personalised pressure pattern, which can define the pressure that is required for navigating between virtual layers.

In one embodiment, during operation, the required pressure pattern can depend on the environment, e.g. level of ambient sound/noise. For instance, softer pressure may be needed in some circumstances (e.g. during a classical concert) and vs harder pressure in some circumstances (e.g. during a heavy metal concert).

Looking now to FIG. 6B, only new or modified steps, compared to FIG. 6A, will be described.

In an optional present symbols step 40, the authentication device 1 presents 40 symbols of available virtual-surface components in respective positions on a touchscreen. When this step is performed, the user input device is in the form of such a touchscreen.

This can comprise presenting different available symbols depending on the virtual surface corresponding to the current depth component. The available symbols can depend on a user configuration. In other words, as illustrated in FIG. 5, different virtual surfaces can have different sets of symbols.

In an optional provide feedback step 41, the authentication device 1 provides, during the progression of user input of the passcode element, feedback on a current depth component, i.e. feedback on the current virtual surface.

The feedback can comprise a visual feedback provided on the touchscreen, e.g. as explained above with reference to FIG. 3A. Alternatively or additionally, the feedback comprises a haptic feedback detectable when using the touchscreen. For instance, a vibration can be generated when transitioning from one virtual surface to another. The vibration can be characteristic for the assuming virtual surface, e.g. one vibration for the first virtual surface, two vibrations for the second virtual surface, etc. In one embodiment, the haptic feedback is repeated, after a small wait, to provide continued feedback to the user, indicating the current virtual surface. The haptic feedback is secure since this is not visible if someone is peeking over a shoulder of the user entering the code. Alternatively or additionally, the feedback comprises audible feedback, e.g. different frequencies or synthesised speech, indicating the current depth component. Audible feedback is particularly useful and secure when the user wears some type of headphones, in which case the audible feedback is only detectable by the user and not any other person in the vicinity.

The type of feedback can depend an environmental state detected by the authentication device, e.g. based on microphone, accelerometer, etc. For instance, if a microphone can detect multiple voices, the visual feedback indicator can be avoided to prevent someone being able to see an indication of the depth component; instead, haptic feedback can be used in this case.

Optionally, another factor of authentication can be combined to further improve security. Such a factor of authentication can e.g. be based on face recognition, fingerprint recognition, etc.

By providing the depth dimension in the passcode entry, it becomes much more difficult for an external party to detect the passcode input. Moreover, the number of possible passcode elements are increased with the number of virtual surfaces that are provided. At the same time, entering the passcode is intuitive and easy for the user.

Figure 7:
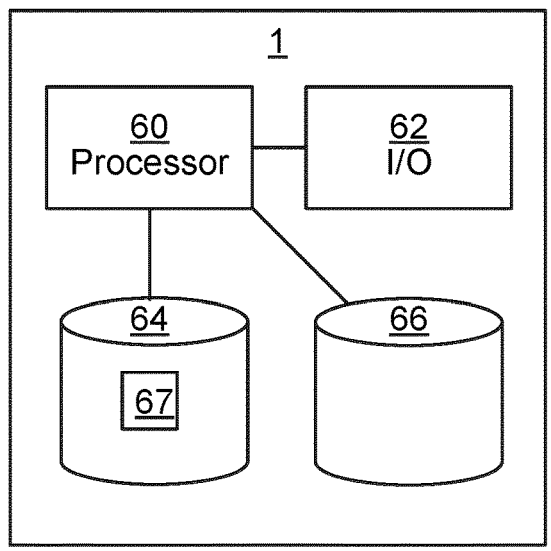
FIG. 7 is a schematic diagram illustrating components of the authentication device of FIG. 1 or 2 according to one embodiment.

FIG. 7 is a schematic diagram illustrating components of the authentication device 1 of FIG. 1 or 2 according to one embodiment. It is to be noted that when the authentication device 1 is implemented in a host device, one or more of the mentioned components can be shared with the host device. A processor 60 is provided using any combination of one or more of a suitable central processing unit (CPU), graphics processing unit (GPU), multiprocessor, microcontroller, digital signal processor (DSP), etc., capable of executing software instructions 67 stored in a memory 64, which can thus be a computer program product. The processor 60 could alternatively be implemented using an application specific integrated circuit (ASIC), field programmable gate array (FPGA), etc. The processor 60 can be configured to execute the method described with reference to FIGS. 6A-B above.

The memory 64 can be any combination of random-access memory (RAM) and/or read-only memory (ROM). The memory 64 also comprises persistent storage, which, for example, can be any single one or combination of magnetic memory, optical memory, solid-state memory or even remotely mounted memory.

A data memory 66 is also provided for reading and/or storing data during execution of software instructions in the processor 60. The data memory 66 can be any combination of RAM and/or ROM.

The authentication device 1 further comprises an I/O interface 62 for communicating with external and/or internal entities. Optionally, the I/O interface 62 also includes a user interface.

Other components of the authentication device 1 are omitted in order not to obscure the concepts presented herein.

Figure 8:
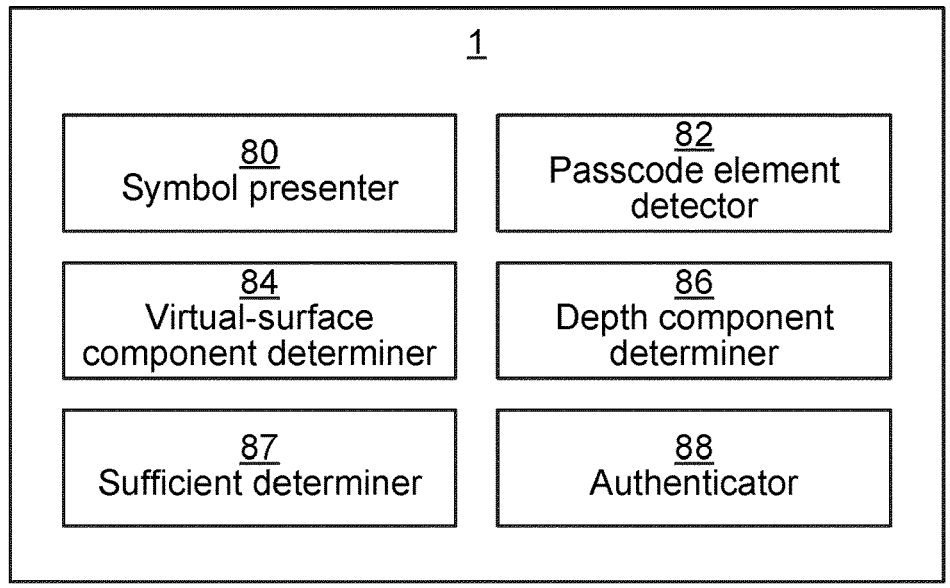
FIG. 8 is a schematic diagram showing functional modules of the authentication device of FIG. 1 or 2 according to one embodiment.

FIG. 8 is a schematic diagram showing functional modules of the authentication device of FIG. 1 or 2 according to one embodiment. The modules are implemented using software instructions such as a computer program executing in the authentication device. Alternatively or additionally, the modules are implemented using hardware, such as any one or more of an ASIC (Application Specific Integrated Circuit), an FPGA (Field Programmable Gate Array), or discrete logical circuits. The modules correspond to the steps in the methods illustrated in FIGS. 6A and 6B.

A symbol presenter 80 corresponds to step 40. A passcode element detector 82 corresponds to step 42. A virtual-surface component determiner 84 corresponds to step 44. A depth component determiner 86 corresponds to step 46. A sufficient determiner 87 corresponds to step 47. An authenticator 88 corresponds to step 48.

Figure 9:
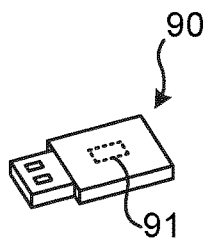
FIG. 9 shows one example of a computer program product comprising computer readable means.

FIG. 9 shows one example of a computer program product 90 comprising computer readable means. On this computer readable means, a computer program 91 can be stored, which computer program can cause a processor to execute a method according to embodiments described herein. In this example, the computer program product is in the form of a removable solid-state memory, e.g. a Universal Serial Bus (USB) drive. As explained above, the computer program product could also be embodied in a memory of a device, such as the computer program product 64 of FIG. 7. While the computer program 91 is here schematically shown as a section of the removable solid-state memory, the computer program can be stored in any way which is suitable for the computer program product, such as another type of removable solid-state memory, or an optical disc, such as a CD (compact disc), a DVD (digital versatile disc) or a Blu-Ray disc.

The aspects of the present disclosure have mainly been described above with reference to a few embodiments. However, as is readily appreciated by a person skilled in the art, other embodiments than the ones disclosed above are equally possible within the scope of the invention, as defined by the appended patent claims. Thus, while various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method for authenticating a user, the method being performed in an authentication device and comprising the steps of:
    detecting a user input of a passcode element to a user input device, wherein the detecting comprises determining a specific virtual surface component of a specific virtual surface, associated with a specific depth component, upon having determined the specific depth component,
    wherein the detected virtual-surface component is one of a finite set of virtual-surface components, being selectable from a specific virtual surface, associated with the specific depth component, selected based on a user of the authentication device exerting physical pressure with a digit on a specific selectable, physical location of the user input device, such that exerting the physical pressure on the user input device results in that, at the virtual surface, one single, detected virtual-surface component associated with the physical location is displayed to the user;
    repeating the steps of detecting a user input, determining a specific virtual-surface component associated with a specific depth component, for a plurality of passcode elements, resulting in a sequence of passcode elements making up a passcode; and
    authenticating the user based on both the virtual-surface component and the depth component of each passcode element in the passcode.

2. The method of claim 1, wherein the step of detecting comprises obtaining the passcode element when it is detected that the user abstains from exerting physical pressure on the user input device.

3. The method of claim 1, wherein the step of detecting comprises obtaining the passcode element when it is detected that the user moves a digit away from a position corresponding to a virtual-surface component.

4. The method of claim 1, wherein the user input device is a touchscreen, wherein each possible virtual-surface component corresponds to a respective symbol, and wherein the method further comprises the step of:
    presenting symbols of available virtual-surface components in respective positions on the touchscreen.

5. The method of claim 4, wherein the step of presenting available symbols comprises presenting different available symbols depending on the virtual surface corresponding to the current depth component.

6. The method of claim 4, wherein the step of presenting available symbols comprises presenting available symbols depending on a user configuration.

7. The method claim 1, wherein
in the step of determining a depth component, a threshold between different depth components depend on a depth component of a subsequent expected passcode element, and
the threshold is determined such that it is easier for the user to input the depth component of a subsequent expected passcode element.

8. An authentication device for authenticating a user, the authentication device comprising:
a processor; and
a memory storing instructions that, when executed by the processor, cause the authentication device to:
detect a user input of a passcode element to a user input device, wherein the detecting comprises determining a specific virtual surface component of a specific virtual surface, associated with a specific depth component, upon having determined the specific depth component, wherein the virtual-surface component is one of a finite set of virtual-surface components, being selectable from a specific virtual surface, associated with the specific depth component, selected based on a user of the authentication device exerting physical pressure with a digit on a specific selectable, physical location of the user input device, such that exerting the physical pressure on the user input device results in that, at the virtual surface, one single, detected virtual-surface component associated with the physical location is displayed to the user;
repeat the instructions to detect a user input, determine a specific virtual-surface component associated with a specific depth component, for a plurality of passcode elements, resulting in a sequence of passcode elements making up a passcode; and
authenticate the user based on both the virtual-surface component and the depth component of each passcode element in the passcode.

9. The authentication device of claim 8, wherein the instructions to detect comprise instructions that, when executed by the processor, cause the authentication device to obtain the passcode element when it is detected that the user abstains from exerting physical pressure on the user input device.

10. The authentication device of claim 8, wherein the instructions to detect comprise instructions that, when executed by the processor, cause the authentication device to obtain the passcode element when it is detected that the user moves a digit away from a position corresponding to a virtual-surface component.

11. The authentication device of claim 8, wherein the user input device is a touchscreen, wherein each possible virtual-surface component corresponds to a respective symbol, and wherein the instructions further comprise instructions that, when executed by the processor, cause the authentication device to:
present symbols of available virtual-surface components in respective positions on the touchscreen.

12. The authentication device of claim 11, wherein the instructions to present available symbols comprise instructions that, when executed by the processor, cause the authentication device to present different available symbols depending on the virtual surface corresponding to the current depth component.

13. The authentication device of claim 11, further comprising instructions that, when executed by the processor, cause the authentication device to provide, during the progression of user input of the passcode element, feedback on a current depth component.

14. The authentication device of claim 13, wherein the feedback comprises a visual feedback provided on the touchscreen.

15. The authentication device of claim 13, wherein the feedback comprises a haptic feedback detectable when using the touchscreen.

16. The authentication device of claim 13, wherein the feedback comprises audible feedback.

17. The authentication device of claim 13, wherein the type of feedback depends an environmental state detected by the authentication device.

18. The authentication device of claim 8, wherein the set of possible virtual-surface components is selected from the group of sets consisting of ten numerical digits, alphabetic letters, and pre-defined set of pictograms.

19. The authentication device of claim 8, wherein a threshold between different depth components depend on a depth component of a subsequent expected passcode element.

20. A non-transitory computer program product, comprising a computer program for authenticating a user, the computer program comprising computer program code which, when executed on a authentication device causes the authentication device to:
detect a user input of a passcode element to a user input device, wherein the detecting comprises determining a specific virtual surface component of a specific virtual surface, associated with a specific depth component, upon having determined the specific depth component, wherein the virtual-surface component is one of a finite set of virtual-surface components, being selectable from a specific virtual surface, associated with the specific depth component, selected based on a user of the authentication device exerting physical pressure with a digit on a specific selectable, physical location of the user input device, such that exerting the physical pressure on the user input device results in that, at the virtual surface, one single, detected virtual-surface component associated with the physical location is displayed to the user;
repeat the code to detect a user input, determine a specific virtual-surface component associated with a specific depth component, for a plurality of passcode elements, resulting in a sequence of passcode elements making up a passcode; and
authenticate the user based on both the virtual-surface component and the depth component of each passcode element in the passcode.

* * * * *